J. Fernald,
Opera Chair,
No. 611. Reissued Oct. 12, 1858.
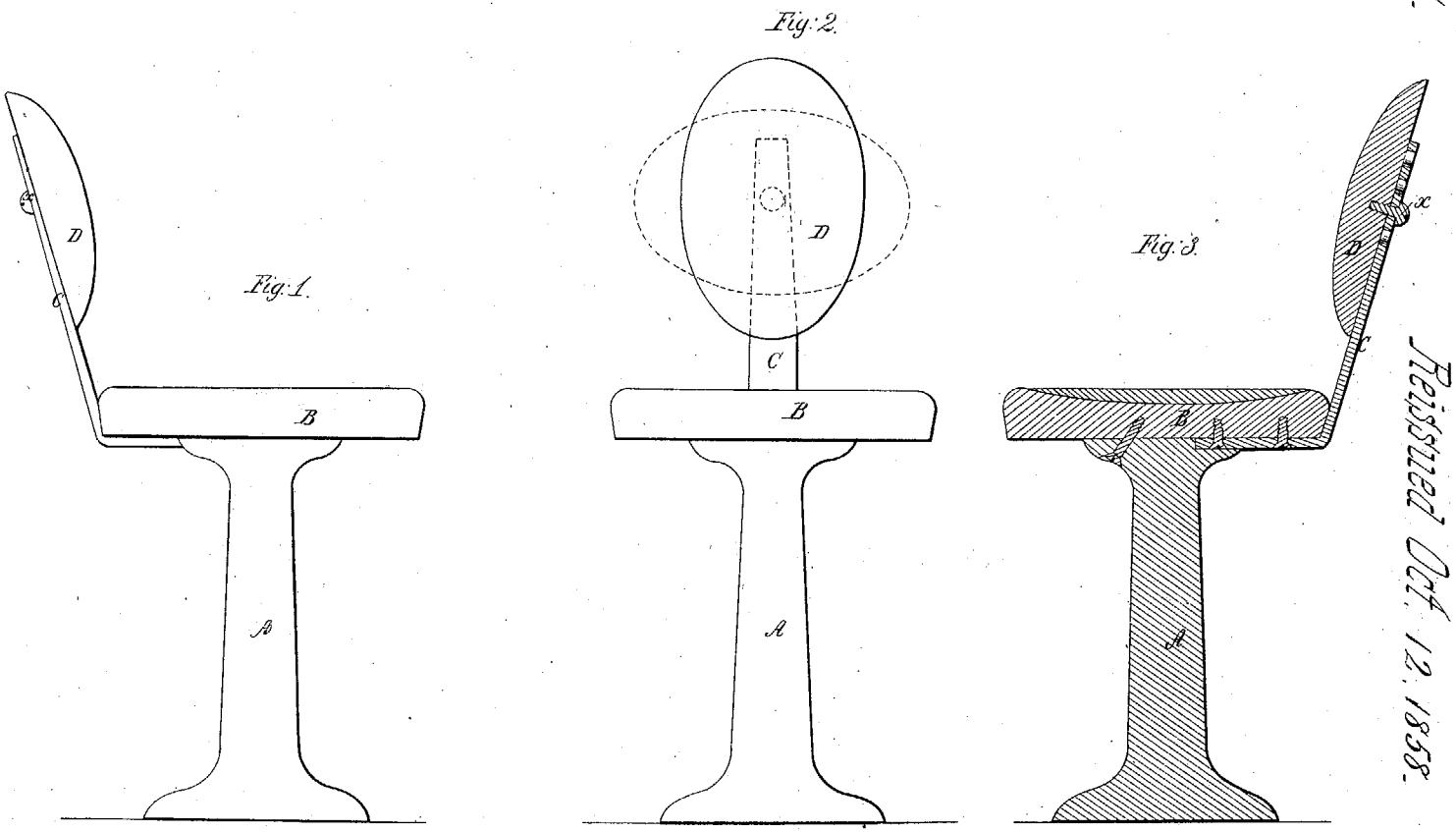
N. PETERS, PHOTO-LITHOGRAPHER, WASHINGTON, D. C.

UNITED STATES PATENT OFFICE.

JAMES FERNALD, OF BOSTON, MASSACHUSETTS.

IMPROVEMENT IN CHAIRS.

Specification forming part of Letters Patent No. 15,405, dated July 22, 1856; Reissue No. 611, dated October 12, 1858.

*To all whom it may concern:*

Be it known that I, JAMES FERNALD, of Boston, in the county of Suffolk and State of Massachusetts, have invented a new and useful or Improved School-Chair; and I do hereby declare that the accompanying specification and annexed drawings fully describe and illustrate the said invention.

The objects I have had in view in my experiments, resulting in the invention of the said chair, have been to produce an article which shall be beyond any chair I know of conducive to the health and easy position of any person who may be obliged to occupy the same for long periods, at successive intervals, and at the same time shall be an article which can be manufactured in quantities at prices which (beyond their worth for comfort) shall commend them for use in the school-room and in all public halls.

Figure 1 of the drawings represents a side elevation of my improved chair. Fig. 2 is a front view, and Fig. 3 a central vertical cross-section, of it.

In the drawings above mentioned, A denotes the pedestal or stand on which the seat B of the chair is to be properly fastened. Said pedestal is made of iron or other suitable material, and is intended to be screwed down upon the floor of the room where the chair is to be placed. The seat B is to be made any convenient form, either round, oblong, or square, and of a proper thickness, and is to have fastened to it and rising from its back an inclined metallic support-rod extending from the seat, as seen in Figs. 2 and 3. Upon the front of this support-rod and at a suitable distance above the seat the back D of the chair is applied. This back D is to be so turned from a solid block of wood that its back shall be flat (so as to be easily and firmly attached to its support) and its front face convex, as seen particularly in Fig. 3. Said back piece is to be fastened to the support C by a screw, *x*, passing through a spring into the center of the back piece, said spring having several holes or a slot made through it so that the back-rest can be elevated or depressed to any convenient height above the seat, and it is made oblong or oval, as seen in Fig. 2, so that by loosening its screw *x* it can be turned, &c. By loosening its screw it can be turned so as to take the position represented by dotted lines in Fig. 2, or it can be rotated any less part of a circle, so as to be presented in any inclined position, if required. The lower end of the support C is bent and extends under the seat B, to which it is properly fastened.

This constitutes the whole construction of my improved chair. Its advantages above others are many.

The comfort of our children during the many and tedious hours they have to spend in the school-room is an object which can be, perhaps, better promoted by the use of seats upon which they can study in an easy posture than by any other means, while the production of a good, comfortable, and simple lecture or hall chair is a hardly less desideratum. The most of such seats or chairs in common use are not only very painful to sit in for great lengths of time, but oftentimes productive of serious injury and contortions of the spine and back. The backs of such chairs are made with sharp protuberances, square corners, and stiff, unyielding backs, thereby inducing the injuries spoken of, while many school-chairs have no backs at all, thus leaving the spine entirely unsupported and producing great weariness to the occupants. Now, the changes or alterations I have effected in the general form of such chairs, though very simple, have produced a much better, easier, and cheaper chair than any I have ever seen. The convex back, being made so as to be adjusted at the proper height, is caused to fit against the spine, just in the position where support is most wanted, in such manner as shall leave the shoulders free to be thrown back and the chest brought forward, while by making it in an oblong or oval form, and to be rotated as described, support may be obtained across the back, or for the shoulders when necessary. The support C may be made of such flexibility as will allow the rest-piece to yield by gentle pressure of the back against it.

The principal feature or novelty in my chair is the improved back. The back-rest being turned and completed from a solid block of wood can be manufactured, especially in large quantities for the use of halls, cars, &c., at very low cost, and the attachment to the seat, being composed of a single plate or bar, adds

BEST AVAILABLE COPY but slightly to the cost of the convex b ıck, while both together form a chair back equal if not superior, as regards comfort, to most of the upholstered chairs in use in such places. A mere convex back I know is not new, neither is it new to apply a chair-back to the seat by springs; but I believe it to be new to manufacture or turn convex backs from or out of solid wood, so that they need no upholstering or cushioning.

As will be seen from the description, the whole chair-back is composed of but two pieces—the back-rest D and its support plate, C—and these applied to the chair-seat, as described, cause the whole to form a very neat symmetrical chair, not at all liable to get out of order, and free from the evils above alluded to.

What, therefore, I claim as my invention is—

1. The new manufacture of chair-back composed of a convex-faced solid block of wood, D, and a single metallic support rod, C, they being constructed and applied together and to the chair-seat, essentially as specified.

2. Making the back-rest D oblong or oval, when made to rotate, in manner and for the purpose as specified.

In testimony whereof I have hereto set set my signature this 24th day of November, A. D. 1856.

JAMES FERNALD.

Witnesses:
PATRICK KELLY,
FRANCIS GOULD.